(12) United States Patent
Schnelle et al.

(10) Patent No.: US 8,396,901 B2
(45) Date of Patent: Mar. 12, 2013

(54) MAPPING OF DATA FROM XML TO SQL

(75) Inventors: Christoph Schnelle, Randwick (AU); Geoffrey John Nolan, Lane Cove (AU)

(73) Assignee: Timebase Pty Limited, Sydney, New South Wales (AU)

( * ) Notice: Subject to any disclaimer, the term of this patent is extended or adjusted under 35 U.S.C. 154(b) by 0 days.

(21) Appl. No.: 13/473,207

(22) Filed: May 16, 2012

(65) Prior Publication Data

US 2012/0226720 A1 Sep. 6, 2012

Related U.S. Application Data

(63) Continuation of application No. 12/073,511, filed on Mar. 6, 2008, now Pat. No. 8,204,913, which is a continuation of application No. 10/233,991, filed on Sep. 3, 2002, now Pat. No. 7,363,310.

(60) Provisional application No. 60/317,038, filed on Sep. 4, 2001.

(51) Int. Cl.
*G06F 17/30* (2006.01)
(52) U.S. Cl. ........................................ 707/802; 707/804
(58) Field of Classification Search ........................ None
See application file for complete search history.

(56) References Cited

U.S. PATENT DOCUMENTS

| | | | |
|---|---|---|---|
| 4,558,413 A | 12/1985 | Schmidt et al. |
| 4,627,019 A | 12/1986 | Ng |
| 4,714,992 A | 12/1987 | Gladney et al. |
| 4,853,843 A | 8/1989 | Ecklund |
| 4,875,159 A | 10/1989 | Cary et al. |
| 4,914,590 A | 4/1990 | Loatman et al. |
| 5,148,154 A | 9/1992 | MacKay et al. |
| 5,193,185 A | 3/1993 | Lanter |
| 5,287,496 A | 2/1994 | Chen et al. |
| 5,302,660 A | 4/1994 | Klinksiek et al. |
| 5,307,456 A | 4/1994 | MacKay |
| 5,355,472 A | 10/1994 | Lewis |
| 5,440,730 A | 8/1995 | Elmasri |
| 5,671,428 A | 9/1997 | Muranaga et al. |
| 5,732,257 A | 3/1998 | Atkinson et al. |
| 5,740,425 A | 4/1998 | Povilus |
| 5,767,854 A | 6/1998 | Anwar |
| 5,786,814 A | 7/1998 | Moran et al. |
| 5,801,702 A | 9/1998 | Dolan et al. |
| 5,831,617 A | 11/1998 | Bhukhanwala |
| 5,835,087 A | 11/1998 | Herz et al. |

(Continued)

FOREIGN PATENT DOCUMENTS

| WO | 97/15890 | 5/1997 |
|---|---|---|
| WO | 98/34179 | 8/1998 |

OTHER PUBLICATIONS

Rule 26(f) Report dated Jun. 21, 2007 for *Timebase Pty Ltd.* v. *The Thomson Corp.*, Case No. 07 CV 1687 (D. Minn.).

(Continued)

*Primary Examiner* — Anteneh Girma
(74) *Attorney, Agent, or Firm* — Jones Day

(57) ABSTRACT

A method, an apparatus and a computer program product for converting an XML encoded dataset into a minimal set of SQL tables and provided. In the method, a hierarchical structure in the XML encoded dataset is identified. A node element set for the XML encoded dataset is determined, wherein each node element in the node element set is a discrete level of the hierarchical structure of the dataset. One or more nodes of the XML encoded dataset are determined, each node being an instance of a node element. A unique node identifier is allocated to each node. Then, an SQL node table containing one or more records is generated, each record corresponding to a respective one of the allocated node identifiers. An SQL ancestry table is optionally generated to define the interrelationships among nodes of the identified hierarchical structure of the XML encoded dataset.

33 Claims, 4 Drawing Sheets

SQL Ancestry Table 40

| desc_id | anc_id |
|---|---|
| 300 | 300 |
| 310 | 300 |
| 310 | 310 |
| 311 | 300 |
| 311 | 310 |
| 311 | 311 |
| 320 | 300 |
| 320 | 320 |
| 321 | 300 |
| 321 | 320 |
| 321 | 321 |

U.S. PATENT DOCUMENTS

| | | | |
|---|---|---|---|
| 5,877,766 | A | 3/1999 | Bates et al. |
| 5,892,513 | A | 4/1999 | Fay |
| 5,893,908 | A | 4/1999 | Cullen et al. |
| 5,935,210 | A | 8/1999 | Stark |
| 5,963,208 | A | 10/1999 | Dolan et al. |
| 6,026,388 | A | 2/2000 | Liddy et al. |
| 6,031,537 | A | 2/2000 | Hugh |
| 6,047,126 | A | 4/2000 | Imai |
| 6,061,697 | A | 5/2000 | Nakao |
| 6,078,934 | A | 6/2000 | Lahey et al. |
| 6,144,962 | A | 11/2000 | Weinberg et al. |
| 6,154,213 | A | 11/2000 | Rennison et al. |
| 6,185,576 | B1 | 2/2001 | McIntosh |
| 6,189,019 | B1 | 2/2001 | Blumer et al. |
| 6,204,850 | B1 | 3/2001 | Green |
| 6,233,592 | B1 | 5/2001 | Schnelle et al. |
| 6,366,933 | B1 | 4/2002 | Ball et al. |
| 6,421,656 | B1 | 7/2002 | Cheng et al. |
| 6,470,490 | B1 | 10/2002 | Hansen |
| 6,502,101 | B1 | 12/2002 | Verprauskus et al. |
| 6,505,191 | B1 | 1/2003 | Baclawski |
| 6,529,905 | B1 | 3/2003 | Bray et al. |
| 6,542,911 | B2 | 4/2003 | Chakraborty et al. |
| 6,581,062 | B1 * | 6/2003 | Draper et al. ................ 1/1 |
| 6,584,459 | B1 | 6/2003 | Chang et al. |
| 6,584,480 | B1 | 6/2003 | Ferrel et al. |
| 6,601,065 | B1 | 7/2003 | Nelson et al. |
| 6,606,653 | B1 | 8/2003 | Ackermann et al. |
| 6,636,845 | B2 | 10/2003 | Chau et al. |
| 6,643,633 | B2 | 11/2003 | Chau et al. |
| 6,708,186 | B1 | 3/2004 | Claborn et al. |
| 6,708,214 | B1 | 3/2004 | La Fleur |
| 6,721,727 | B2 | 4/2004 | Chau et al. |
| 6,772,139 | B1 | 8/2004 | Smith, III |
| 6,823,495 | B1 | 11/2004 | Vedula et al. |
| 6,826,726 | B2 | 11/2004 | Hsing et al. |
| 6,832,219 | B2 | 12/2004 | Lal |
| 6,836,778 | B2 | 12/2004 | Manikutty et al. |
| 6,853,997 | B2 | 2/2005 | Wotring et al. |
| 6,886,005 | B2 | 4/2005 | Davis |
| 6,934,712 | B2 | 8/2005 | Kieman |
| 6,944,817 | B1 | 9/2005 | Danneels |
| 6,947,945 | B1 | 9/2005 | Carey et al. |
| 6,950,913 | B2 | 9/2005 | Glasco |
| 7,028,147 | B2 | 4/2006 | Wu et al. |
| 7,075,536 | B1 | 7/2006 | Goldschmidt |
| 7,293,228 | B1 | 11/2007 | Lessing et al. |
| 7,376,674 | B2 | 5/2008 | Lastovica |
| 7,412,535 | B2 | 8/2008 | Agarwalla et al. |
| 7,526,479 | B2 | 4/2009 | Zenz |
| 2001/0037345 | A1 | 11/2001 | Kieman et al. |
| 2001/0047372 | A1 | 11/2001 | Gorelik et al. |
| 2002/0010700 | A1 | 1/2002 | Wotring et al. |
| 2002/0010711 | A1 | 1/2002 | Nakanishi et al. |
| 2002/0023091 | A1 | 2/2002 | Silberberg et al. |
| 2002/0116371 | A1 | 8/2002 | Dodds et al. |
| 2002/0120630 | A1 | 8/2002 | Christianson et al. |
| 2002/0129052 | A1 | 9/2002 | Glazer et al. |
| 2002/0133484 | A1 | 9/2002 | Chau et al. |
| 2002/0133497 | A1 | 9/2002 | Draper et al. |
| 2002/0156811 | A1 * | 10/2002 | Krupa ................ 707/513 |
| 2002/0169788 | A1 | 11/2002 | Lee et al. |
| 2002/0194357 | A1 | 12/2002 | Harris et al. |
| 2003/0023754 | A1 | 1/2003 | Eichstadt et al. |
| 2003/0041305 | A1 | 2/2003 | Schnelle et al. |
| 2003/0140308 | A1 | 7/2003 | Murthy et al. |
| 2003/0167420 | A1 | 9/2003 | Parsons |
| 2003/0167456 | A1 | 9/2003 | Sabharwal |
| 2003/0177443 | A1 | 9/2003 | Schnelle et al. |
| 2003/0226108 | A1 | 12/2003 | Oezgen |
| 2004/0093469 | A1 | 5/2004 | Glasco |
| 2004/0139327 | A1 | 7/2004 | Brown et al. |
| 2004/0162807 | A1 * | 8/2004 | Montagne ................ 707/1 |
| 2004/0183831 | A1 | 9/2004 | Ritchy et al. |
| 2004/0220927 | A1 | 11/2004 | Murthy et al. |
| 2005/0039109 | A1 | 2/2005 | Schumacher et al. |
| 2005/0171946 | A1 | 8/2005 | Maim |
| 2005/0278475 | A1 | 12/2005 | Karatal et al. |
| 2006/0181531 | A1 | 8/2006 | Goldschmidt |
| 2007/0174541 | A1 | 7/2007 | Chandrasekaran et al. |
| 2007/0192246 | A1 | 8/2007 | Futamase |
| 2007/0288890 | A1 | 12/2007 | Wells |

OTHER PUBLICATIONS

Electronic Discovery Protocol filed with Rule 26(f) Report dated Jun. 21, 2007 for *Timebase Pty Ltd.* v. *The Thomson Corp.*, Case No. 07 CV 1687 (D. Minn.).

Plaintiff's Proposed Protective Order filed with Rule 26(f) Report dated Jun. 21, 2007 for *Timebase Pty Ltd.* v. *The Thomson Corp.*, Case No. 07 CV 1687 (D. Minn.).

Defendant's Proposed Protective Order filed with Rule 26(f) Report dated Jun. 21, 2007 for *Timebase Pty Ltd.* v. *The Thomson Corp.*, Case No. 07 CV 1687 (D. Minn.).

Transcript of Proceedings filed Feb. 26, 2008 for *Timebase Pty Ltd.* v. *The Thomson Corp.*, Case No. 07 CV 1687 (D. Minn.).

Letter from Grey Plant & Moody dated Jun. 1, 2007 for *Timebase Pty Ltd.* v. *The Thomson Corp.*, Case No. 07 CV 1687 (D. Minn.).

Letter from Niro, Scavone, Haller & Niro dated Dec. 21, 2007 for *Timebase Pty Ltd.* v. *The Thomson Corp.*, Case No. 07 CV 1687 (D. Minn.).

Letter from Faegre and Benson dated Dec. 20, 2007 for *Timebase Pty Ltd.* v. *The Thomson Corp.*, Case No. 07 CV 1687 (D. Minn.).

Letter from Faegre and Benson dated Apr. 1, 2008 for *Timebase Pty Ltd.* v. *The Thomson Corp.*, Case No. 07 CV 1687 (D. Minn.).

Letter from Niro, Scavone, Haller & Niro dated Apr. 17, 2008 for *Timebase Pty Ltd.* v. *The Thomson Corp.*, Case No. 07 CV 1687 (D. Minn.).

Motion to Stay Litigation Pending Reexamination Proceedings dated Jun. 14, 2007 for *Timebase Pty Ltd.* v. *The Thomson Corp.*, Case No. 07 CV 1687 (D. Minn.).

Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 1 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 2 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 3 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 4 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 5 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 6 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 7 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 8 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 9 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Timebase's Response to Thompson's Motion to Stay dated Jun. 21, 2007 for *Timebase Pty Ltd.* v. *The Thomson Corp.*, Case No. 07 CV 1687 (D. Minn.).
Exhibit A for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit B for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit C for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit D for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit E for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit F for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit G for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit H for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit I for Timebase's Response to Thompson's Motion to Stay dated Jun. 21, 2007 for *Timebase Pty Ltd.* v. *The Thomson Corp.*, Case No. 07 CV 1687 (D. Minn).
Exhibit J for Timebase's Response to Thompson's Motion to Stay dated Jun. 21, 2007 for *Timebase Pty Ltd.* v. *The Thomson Corp.*, Case No. 07 CV 1687 (D. Minn.).
Order dated Feb. 7, 2008 for *Timebase Pty Ltd.* v. *The Thomson Corp.*, Case No. 07 CV 1687 (D. Minn.).
Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 1 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 2 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 3 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 4 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 5 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 6 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 7 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Complaint dated Jan. 24, 2007 for *Timebase Pty Ltd.* v. *The Thomson Corp.*, Case No. 07 CV 1687 (D. Minn.).
Document 19-3 Complaint dated Mar. 28, 2007 for *Timebase Pty Ltd.* v. *The Thomson Corp.*, Case No. 07 CV 1687 (D. Minn.).
Plaintiff's Motion for Leave to Serve and File Amended Complaint dated May 10, 2007 for *Timebase Pty Ltd.* v. *The Thomson Corp.*, Case No. 07 CV 1687 (D. Minn.).
Exhibit A Amended Complaint dated May 10, 2007 for *Timebase Pty Ltd.* v. *The Thomson Corp.*, Case No. 07 CV 1687 (D. Minn.).
Plaintiff's Memorandum in Support of Motion for Leave to Serve and File Amended Complaint dated May 10, 2007 for *Timebase Pty Ltd.* v. *The Thomson Corp.*, Case No. 07 CV 1687 (D. Minn.).
Stipulation to Plaintiff's Amended Complaint dated Jun. 1, 2007 for *Timebase Pty Ltd.* v. *The Thomson Corp.*, Case No. 07 CV 1687 (D. Minn.).
Order dated Jun. 6, 2007 for *Timebase Pty Ltd.* v. *The Thomson Corp.*, Case No. 07 CV 1687 (D, Minn.).
Amended Complaint dated Jun. 18, 2007 for *Timebase Pty Ltd.* v. *The Thomson Corp.*, Case No. 07 CV 1687 (D. Minn.).
Defendants' Joint Answer and Defenses to Plaintiff's Amended Complaint dated Jun. 18, 2007 for *Timebase Pty Ltd.* v. *The Thomson Corp.*, Case No. 07 CV 1687 (D. Minn.).
Notice of Motion dated Feb. 9, 2007 for *Timebase Pty Ltd.* v. *The Thomson Corp.*, Case No. 07 CV 1687 (D. Minn.).
Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Declaration of Andrew Martens dated Feb. 9, 2007 for *Timebase Pty Ltd.* v. *The Thomson Corp.*, Case No. 07 CV 1687 (D. Minn.).
Declaration of Chad Drown dated Feb. 9, 2007 for *Timebase Pty Ltd.* v. *The Thomson Corp.*, Case No. 07 CV 1687 (D. Minn.).
Exhibits A-D for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Exhibits E-H for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Exhibit I for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Timebase's Response to The Thompson Corporation's Motion to Transfer dated Feb. 26, 2007 for *Timebase Pty Ltd.* v. *The Thomson Corp.*, Case No. 07 CV 1687 (D. Minn.).
Exhibits 1-5 for Timebase's Response to the Thompson Corporation's Motion to Transfer dated Feb. 26, 2007 for *Timebase Pty Ltd.* v. *The Thomson Corp.*, Case No. 07 CV 1687 (D. Minn.).
Defendant Thompson Corporation's Reply Brief in Support of its Motion to Transfer Venue to the District of Minnesota and for a More Definite Statement dated Mar. 5, 2007 for *Timebase Pty Ltd.* v. *The Thomson Corp.*, Case No. 07 CV 1687 (D. Minn.).
Second Declaration of Andrew Martens dated Mar. 5, 2007 for *Timebase Pty Ltd.* v. *The Thomson Corp.*, Case No. 07 CV 1687 (D. Minn.).
Certificate of Service dated Mar. 5, 2007 for *Timebase Pty Ltd.* v. *The Thomson Corp.*, Case No. 07 CV 1687 (D. Minn.).
Court Docket Entry dated Mar. 9, 2007 for *Timebase Pty Ltd.* v. *The Thomson Corp.*, Case No. 07 CV 1687 (D. Minn.).
Memoranum Opinion and Order dated Mar. 9, 2007 for *Timebase Pty Ltd.* v. *The Thomson Corp.*, Case No. 07 CV 1687 (D. Minn.).
Document 19-1 Memorandum Opinion and Order dated Mar. 28, 2007 for *Timebase Pty Ltd.* v. *The Thomson Corp.*, Case No. 07 CV 1687 (D. Minn.).

Cover Letter for Transfer of Case dated Mar. 26, 2007 for *Timebase Pty Ltd.* v. *The Thomson Corp.*, Case No. 07 CV 1687 (D. Minn.).
Rule 26(f) Report (Patent Cases) for *Timebase Pty Ltd.* v. *The Thomson Corp.*, Case No. 07 CV 4551 (D. Minn.).
Timebase's First Set of Requests for the Production of Documents (Nos. 1-40) to The Thompson Corporation dated Mar. 3, 2008 for *Timebase Pty Ltd.* v. *The Thomson Corp.*, Case No. 07 CV 4551 (D. Minn).
Timebase's First Set of Requests for the Production of Documents (Nos. 1-40) to West Publishing Corporation dated Mar. 3, 2008 for *Timebase Pty Ltd.* v. *The Thomson Corp.*, Case No. 07 CV 4551 (D. Minn.).
Timebase's First Set of Requests for the Production of Documents (Nos. 1-40) to West Services Inc. dated Mar. 3, 2008 for *Timebase Pty Ltd.* v. *The Thomson Corp.*, Case No. 07 CV 4551 (D. Minn.).
Defendant The Thompson Corporation's Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
Defendants' First Set of Requests for Production of Documents and Things to Plaintiff Timebase Pty Ltd. dated Apr. 3, 2008 for *Timebase Pty Ltd.* v. *The Thomson Corp.*, Case No. 07 CV 4551 (D. Minn.).
Defendant Thompson Corporation's Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Defendant West Corporation's Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Defendant West Services, Inc.'s Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Timebase's Response to Defendant's First Set of Requests for Production of Documents (Nos. 1-49) dated May 5, 2008 for *Timebase Pty Ltd.* v. *The Thomson Corp.*, Case No. 07 CV 4551 (D. Minn.).
Transcript of Proceedings Re. Defendants' Motion to Consolidate dated Jan. 24, 2008 for *Timebase Pty Ltd.* v. *The Thomson Corp.*, Case No. 07 CV 4551 (D. Minn.).
Transcript of Proceedings Re. Defendants' Motion to Consolidate (filed Feb. 26, 2008) dated Jan. 24, 2008 for *Timebase Pty Ltd.* v. *The Thomson Corp.*, Case No. 07 CV 4551 (D. Minn.).
Transcript of Proceedings Re. Defendants' Motion to Stay (filed Feb. 26, 2008) for *Timebase Pty Ltd.* v. *The Thomson Corp.*, Case No. 07 CV 4551 (D. Minn.).
Timebase's Interrogatories Nos. 1-5 for the Defendant, The Thompson Corporation dated Mar. 24, 2008 for *Timebase Pty Ltd.* v. *The Thomson Corp.*, Case No. 07 CV 4551 (D. Minn.).
Timebase's Interrogatories Nos. 1-5 for the Defendant, West Publishing Corporation dated Mar. 24, 2008 for *Timebase Pty Ltd.* v. *The Thomson Corp.*, Case No. 07 CV 4551 (D. Minn.).
Timebase's Interrogatories Nos. 1-5 for the Defendant, West Services, Inc. dated Mar. 24, 2008 for *Timebase Pty Ltd.* v. *The Thomson Corp.*, Case No. 07 CV 4551 (D. Minn.).
Defendant West Publishing Corporation's Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
Defendant West Services Inc.'s Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
The Thompson Corporation's Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).
West Publishing Corporation's Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).

West Services Inc.'s Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).
Letter from Faegre and Benson enclosing Verification Pages dated May 5, 2008 for *Timebase Pty Ltd.* v. *The Thomson Corp.*, Case No. 07 CV 4551 (D. Minn.).
Letter from David J. F. Gross dated Apr. 1, 2008 for *Timebase Pty Ltd.* v. *The Thomson Corp.*, Case No. 07 CV 4551 (D. Minn.).
Letter from Niro, Scavone, Haller & Niro dated Apr. 17, 2008 for *Timebase Pty Ltd.* v. *The Thomson Corp.*, Case No. 07 CV 4551 (D. Minn.).
Defendants' Memorandum in Support of Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Timebase's Response to Thompson's Motion to Stay and Consolidate dated Jan. 17, 2008 for *Timebase Pty Ltd.* v. *The Thomson Corp.*, Case No. 07 CV 4551 (D. Minn.).
Order (filed Feb. 12, 2008) dated Feb. 7, 2008 for *Timebase Pty Ltd.* v. *The Thomson Corp.*, Case No. 07 CV 4551 (D. Minn.).
Defendant's Appeal of and Objections to Orders Denying a Stay of the '228 Case (No. 07-4551) and Lifting the Stay of the '592 Case (No. 07-1687) dated Feb. 26, 2008 for *Timebase Pty Ltd.* v. *The Thomson Corp.*, Case No. 07 CV 4551 (D. Minn.).
Defendant's Memorandum in Support of Appeal of and Objections to Orders Denying a Stay of the '228 Case (No. 07-4551) and Lifting the Stay of the '592 Case (No. 07-1687) dated Feb. 26, 2008 for *Timebase Pty Ltd.* v. *The Thomson Corp.*, Case No. 07 CV 4551 (D. Minn.).
Order (Exhibit 1) dated Feb. 7, 2008 for *Timebase Pty Ltd.* v. *The Thomson Corp.*, Case No. 07 CV 4551 (D. Minn.).
Order (Exhibit 2) dated Feb. 7, 2008 for *Timebase Pty Ltd.* v. *The Thomson Corp.*, Case No. 07 CV 4551 (D. Minn).
Timebase's Response to Defendant's Memorandum in Support of Appeal of and Objections to Orders Denying a Stay of the '228 Case (No. 07-4551) and Lifting the Stay of the '592 Case (No. 07-1687) dated Mar. 11, 2008 for *Timebase Pty Ltd.* v. *The Thomson Corp.*, Case No. 07 CV 4551 (D. Minn.).
Order dated Apr. 18, 2008 for *Timebase Pty Ltd.* v. *The Thomson Corp.*, Case No. 07 CV 4551 (D. Minn.).
Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 4551 (D. Minn.).
Order dated May 6, 2008 for *Timebase Pty Ltd.* v. *The Thomson Corp.*, Case No. 07 CV 4551 (D. Minn.).
Complaint dated Nov. 7, 2007 for *Timebase Pty Ltd.* v. *The Thomson Corp.*, Case No. 07 CV 4551 (D. Minn.).
Defendant's Answer to Plaintiff's Complaint dated Nov. 29, 2007 for *Timebase Pty Ltd.* v. *The Thomson Corp.*, Case No. 07 CV 4551 (D. Minn.).
Order of Direction to the Clerk of the Court for Reassignment of Related Case dated Nov. 28, 2007 for *Timebase Pty Ltd.* v. *The Thomson Corp.*, Case No. 07 CV 4551 (D. Minn.).
Defendant's Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Defendant's Memorandum in Support of Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Defendant's Prior Art Statement for *Timebase Pty Ltd.* v. *The Thomson Corp.*, Case No. 07 CV 1687 (D. Minn.) Oct. 23, 2009.
Appendix A to Defendant's Prior Art Statement for *Timebase Pty Ltd.* v. *The Thomson Corp.*, Case No. 07 CV 1687 (D. Minn.) Oct. 23, 2009.
Appendix B to Defendant's Prior Art Statement for *Timebase Pty Ltd.* v. *The Thomson Corp.*, Case No. 07 CV 1687 (D. Minn.) Oct. 23, 2009.
Appendix C to Defendant's Prior Art Statement for *Timebase Pty Ltd.* v. *The Thomson Corp.*, Case No. 07 CV 1687 (D. Minn.) Oct. 23, 2009.

Appendix D to Defendant's Prior Art Statement for *Timebase Pty Ltd. v. The Thomson Corp.*, Case No. 07 CV 1687 (D. Minn.) Oct. 23, 2009.

Appendix E to Defendant's Prior Art Statement for *Timebase Pty Ltd. v. The Thomson Corp.*, Case No. 07 CV 1687 (D. Minn.) Oct. 23, 2009.

Appendix F to Defendant's Prior Art Statement for *Timebase Pty Ltd. v. The Thomson Corp.*, Case No. 07 CV 1687 (D. Minn.) Oct. 23, 2009.

Appendix G to Defendant's Prior Art Statement for *Timebase Pty Ltd. v. The Thomson Corp.*, Case No. 07 CV 1687 (D. Minn.) Oct. 23, 2009.

Thompson's First Supplemental Objections and Answers to Timebase's First Set of Interrogatories (Nos. 1-5) (Redacted) for *Timebase Pty Ltd. v. The Thomson Corp.*, Case No. 07 CV 1687 (D. Minn.) Sep. 3, 2009.

Defendant's Supplemental Prior Art Statement for *Timebase Pty Ltd. v. The Thomson Corp.*, Case No. 07 CV 1687 (D. Minn.) Apr. 2, 2010.

Appendix A to Defendant's Supplemental Prior Art Statement for *Timebase Pty Ltd. v. The Thomson Corp.*, Case No. 07 CV 1687 (D. Minn.) Apr. 2, 2010.

Appendix B to Defendant's Supplemental Prior Art Statement for *Timebase Pty Ltd. v. The Thomson Corp.*, Case No. 07 CV 1687 (D. Minn) Apr. 2, 2010.

Appendix C to Defendant's Supplemental Prior Art Statement for *Timebase Pty Ltd. v. The Thomson Corp.*, Case No. 07 CV 1687 (D. Minn.) Apr. 2, 2010.

Appendix D to Defendant's Supplemental Prior Art Statement for *Timebase Pty Ltd. v. The Thomson Corp.*, Case No. 07 CV 1687 (D. Minn.) Apr. 2, 2010.

Appendix E to Defendant's Supplemental Prior Art Statement for *Timebase Pty Ltd. v. The Thomson Corp.*, Case No. 07 CV 1687 (D. Minn.) Apr. 2, 2010.

Appendix F to Defendant's Supplemental Prior Art Statement for *Timebase Pty Ltd. v. The Thomson Corp.*, Case No. 07 CV 1687 (D. Minn.) Apr. 2, 2010.

Appendix G to Defendant's Supplemental Prior Art Statement for *Timebase Pty Ltd. v. The Thomson Corp.*, Case No. 07 CV 1687 (D. Minn.) Apr. 2, 2010.

Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Agosti for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Anwar for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Arnold Moore Feb. 1997 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Arnold-Moore 1994 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Arnold-Moore Feb. 1994 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Arnold-Moore 1995 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Arnold-Moore 1997 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Astoria for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Azaria for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Bachman 1973 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Bentley for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Campbell for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Documentum for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Dolan for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Elmasri 1990 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Fay 1996 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Haake for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Hansen for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Hirohama 1990 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Horne 1997 for Timebase's Response to Defendant's Prior Art Statement for *Timebase Pty Ltd. v. The Thomson Corp.*, Case No. 07 CV 1687 (D. Minn) Feb. 1, 2010.

Claim Chart comparing claims of US Patent No. 6,233,592 to Kim 1996 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Kimball for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Liddy for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Lo 1995 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Lo 1996 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Osterbye 1992 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Povilus 1995 for Timebase's Response to Defendant's Prior Art Statement for *Timebase Pty Ltd. v. The Thomson Corp.*, Case No. 07 CV 1687 (D. Minn) Feb. 1, 2010.

Claim Chart comparing claims of US Patent No. 6,233,592 to Promenschenkel 1995 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Sacks-Davis 1994 for Timebase's Response to Defendant's Prior Art Statement for *Timebase Pty Ltd. v. The Thomson Corp.*, Case No. 07 CV 1687 (D. Minn) Feb. 1, 2010.

Claim Chart comparing claims of US Patent No. 6,233,592 to Sacks-Davis 1995 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to SCALEplus for Timebase's Response to Defendant's Prior Art Statement for *Timebase Pty Ltd. v. The Thomson Corp.*, Case No. 07 CV 1687 (D. Minn.) Feb. 1, 2010.

Claim Chart omparing claims of US Patent No. 6,233,592 to Sciore 1991 for Timebase's Response to Defendant's Prior Art Statement for *Timebase Pty Ltd. v. The Thomson Corp.*, Case No. 07 CV 1687 (D. Minn) Feb. 1, 2010.

Claim Chart comparing claims of US Patent No. 6,233,592 to Sciore 1994 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Stonebraker 1994 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Taylor for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Travis Waldt for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Wilkinson for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Wilson 1988 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Wilson 1990 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 6,233,592 to Wilson 1992 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Agosti for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Anwar for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Arnold Moore 1997-2 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Arnold-Moore 1994 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Arnold-Moore 1994-2 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Arnold-Moore 1995 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Arnold-Moore 1997 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Astoria for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Azaria for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Bachman 1973 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Bentley for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Campbell for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Caplinger for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Documentum for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Elmasri 1990 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7.293,228 to Fay 1996 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Haake for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Hansen for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Hirohama 1990 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Horne 1997 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Kim 1996 for Timebase's Response to Defendant's Prior Art Statement for *Timebase Pty Ltd. v. The Thomson Corp.*, Case No. 07 CV 1687 (D. Minn.) Feb. 1, 2010.

Claim Chart comparing claims of US Patent No. 7,293,228 to Kimball for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Liddy for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Noik for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Osterbye 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Povilus 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Promenschenkel 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sacks-Davis 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sacks-Davis 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to SCALEplus for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1991 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Stonebraker 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Taylor for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Travis Waldt for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Weinberg for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilkinson for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1988 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1992 for Timebase's Response to Defendant's Prior Art Statement for *Timebase Pty Ltd.* v. *The Thomson Corp.*, Case No. 07 CV 1687 (D. Minn.) Feb. 1, 2010.
Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to Peltonen for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to SCALEPlus System for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Peltonen for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 SCALEPlus System for Timebase's Supplemental Response to Defendant's Prior Art Statement for *Timebase Pty Ltd.* v. *The Thomson Corp.*, Case No. 07 CV 1687 (D. Minn.) May 28, 2010.
Agosti, M., Colotti, R., Gradenigo, G., "A Two-Level Hypertext Retrieval Model for Legal Data,"(1991) ("Agosti 1991").
Arnold-Moore, T. & Sacks-Davis, R., "Databases of Legislation: The Problems of Consolidation,"Collaborative Information Technology Research Institute, TR-94-9, Jul. 4, 1994 ("Arnold-Moore 1994").
Arnold-Moore, T., "Automatically Processing Amendments to Legislation,"1995 ACM 0-89791-758-8/95/0005/0297 ("Arnold-Moore 1995").
Arnold-Moore, T., "Automatic Generation of Amendment Legislation,"1997 ACM 0-89791-924-6/97/96 ("Arnold-Moore 1997").
Arnold-Moore, T. Anderson, P., Sacks-Davis R., "Managing a Digital Library of Legislation,"(1997) ("Arnold-Moore 1997-2").
Azaria, A., Network World, "SGML: A Lifesaver in a Sea of Electronic Documents,"(Dec. 12, 1994) ("Azaria 1994").
Bachman, C., "The Programmer as Navigator,"(1973) ("Bachman 1973").
Bentley, J., Friedman, J., "Data Structures for Range Searching,"(1979) ("Bentley 1979").
Campbell, B. Goodman, J "HAM: A General Purpose Hypertext Abstract Machine,"(1988) ("Campbell 1988").
Caplinger, M., "Graphical Database Browsing,"(1986) ("Caplinger 1986").
Haake, A., "CoVer: A Contextual Version Server for Hypertext Applications,"Proceedings of the ACM ECHT Conference, Nov. 30-Dec. 4, 1992 ("Haake 1992").
Horne, Roger, "The Statute Law Database,"(1997) ("Horne 1997").
Kim, H., Shin, H. Chang, J. "OOHS: An Object-Oriented Hypermedia System," Proceedings of the COMPSAC '96, 0730-3157/96 ("Kim 1996").
Kimball, R., "The Data Warehouse Toolkit: Practical Techniques for Building Dimensional Data VVarehouses,"(1996) ("Kimball 1996").
Lo, C. "Integrating Links and Versioning in Document Management,"(1995) ("Lo 1995").

Lo, C., "Link and Versioning Management in an SGML Based Document Management System," (1996) ("Lo 1996").
Noik, E. "Exploring Large Hyperdocuments: Fisheye Views of Nested Networks,"(1993) ("Noik 1993").
Osterbye, K., "Structural and Cognitive Problems in Providing Version Control for Hypertext,"(1992) ("Osterbye 1992").
Promenschenkel, G., "STEPS toward a new era in electronic publishing,"OCLC Newsletter No. 216, published by OCLC, Jul./Aug. 1995 ("Promenschenkel 1995").
Sacks-Davis, R., Kent, A., Ramamohanarao, K., Thom, J., Zobel, J., "Atlas: A Nested Relational Database System for Text Applications,"(1995) ("Sacks-Davis 1995").
Sciore, E., "Multidimensional Versioning for Object-Oriented Databases,"Lecture Notes in Computer Science, Deductive and Object-Oriented Databases, Munich Germany (1991) ("Sciore 1991").
Sciore, E., "Versioning and Configuration Management in an Object-Oriented Data Model," VLDB Journal 3, 77-106 (1994) ("Sciore 1994").
Stonebraker, M., Rowe, L. Hirohama, M., "The Implementation of Postgres,"(1990) ("Hirohama 1990").
Stonebraker, M., Chen, J., Nathan, N., Paxson, C., Wu, J., "Tioga: Providing Data Management Support for Scientific Visualization Applications," 1994 IEEE Symposium on Visual Languages (1994) ("Stonebraker 1994").
Taylor, C., Tudhope, D., Beynon-Davies, P., "Technical Briefing Representation and Manipulation of Conceptual Temporal and Geographical Knowledge in a Museum Hypermedia System,"(1994) ("Taylor 1994").
Travis, B. Waldt, D., "The SGML Implementation Guide: A Blueprint for SGML Migration,"(1995) ("Travis & Waldt").
Wilkinson, R., Arnold-Moore, T., Fuller, M., Sacks-David, R., Thom, J., Zobel, J., "Document Computing: Technologies for Managing Electronic Document Collections,"(1998) ("Wilkinson 1998").
Wilson, E., "Reference and Reference Inversion in Statutes and Cases: a Hypertext Solution,"(1988) ("Wilson 1988").
Wilson, E., "Cases for Justus: Preparing a Case Database for a Hypertext Information Retrieval System,"(1990) ("Wilson 1990").
Wilson, E., "Guiding Lawyers: Mapping Law into Hypertext,"Artificial Intelligence Review 6, 161-89 (1992) ("Wilson 1992").
Larson R. "Hypertext and Information Retrival: Towards the Next Generation of Information Systems," (1988) (Larson 1988).
Peltonen, H. Mannisto, T. Alho, K., Sulonen, R., "An Engineering Document Management System" (1993) ("Peltonen 1993").
Premise Publisher for Windows, User Manual ("Premise Publisher").
Premise Research Software for Windows, User's Guide ("Premise Research").
Westlaw DataBasics(1993) ("DataBasics 1993").
Teply, L., "Legal Research and Citation,"(1992) ("Teply 1992").
Johnson, N., Berring, R., Woxland, T., "Winning Research Skills,"(1991) ("Johnson 1991").
Password: Power Research,(May 1991) ("Password 1991").
Westlaw Reference Manual(1993) ("Westlaw Ref 1993").
Wren, C. Wren, J., "Using Computers in Legal Research: A Guide to Lexis and Westlaw,"(1994) ("Wren 1994").
Discovering Westlaw: The Essential Guide (1992) (DOCNO 00078880) ("Essential Guide").
Westmate 5.1 for Windows, User Manual, (1993) ("Westmate User Guide 1993").
Discovering Westlaw: The Essential Guide (1996) ("Essential Guide").
Arnold-Moore, T., Anderson, P., Sacks-Davis R., "Managing a Digital Library of Legislation,"(1997) ("Arnold-Moore 1997-2").
Arnold-Moore, T., "Information Systems for Legislation,"(thesis) (1998?) ("Arnold-Moore Thesis").
Arnold-Moore, T., Clemes, J., Tadd, M. "Connected to the Law: Tasmanian Legislation Using EnAct,"1999. ("Arnold-Moore 1999").
Arnold-Moore, T., "System Architecture: A Developer's View," ("Arnold-Moore A").
Cook, J., Arnold-Moore, T., Paice, S., "Legislation in Its Natural State,"SGML Asia-Pacific Conference (Sep. 25, 1996).

CITRI Information (R&D Information) [SAIC001979-SAIC001995].
McGhie, L., O'Sullivan, C., Australian Law Librarian, "Tasmanian, Western Australian and Queensland Legislation on the Internet,"(Jun. 1998) ("McGhie 1998").
RMIT, "Connected to the Law: Tasmanian Legislation Using EnAct,"("RMIT 1").
Tadd, M., "A New Way of Looking at the Law: The EnAct Legislation System,"("Tadd").
Tasmanian State Service, "Legislative System Project Newsletter,"(Jun. 1997) ("LSP Newsletter 1997") ("TSS 1997").
Tasmanian State Service, "Legislative System Project Newsletter,"(Feb. 1998) ("LSP Newsletter 1998") ("TSS 1998").
Screen Shots of EnAct.
Wilkinson, R., Arnold-Moore, T., Fuller, M., Sacks-David, R., Thom, J., Zobel, J. "Document Computing: Technologies for Managing Electronic Document Collections," (1998) ("Wilkinson 1998").
http://www.thelaw.tas.gov.au (and subpages, including help screens) (also including prior versions found on www.archive.org).
http://web.archive.org/web/19981205075517/www.thelaw.tas.gov.au/start.html.
http://web.archive.org/web/19990430002036/www.thelaw.tas.gov.au/background.html.
ELI 1997 Conference Program ("ELI Program").
Kerr, P., Hoyle, A., Gilchrist, J., An Introduction to Legal Resources on the Internet (2000) ("Kerr 2000").
SCALEplus User Manual (Version 3.0, Jan. 20, 1998) ("SCALEplus UM").
http://www.austlii.edu.au/austlii/guide/current/20030315--6.html#Heading1298.
SCALEplus User Manual (Version 30, Jan. 20, 1998) ("SCALplus UM 2").
SCALEplus Secrets.
Documentum LeafConnect for Interleaf (1996) ("Leafconnect 1996").
Interleaf 6 SGML (1995) ("Interleaf 6 1995").
Interleaf 6 Workgroup Tools (1995) ("Interleaf Workgroup 1995").
Interleaf 5 <SGML> User's Guide (1994) ("Interleaf UG 1994").
Interleaf Publisher ("Interleaf Publisher").
Documentum Workspace(Oct. 14, 1996) ("Documentum Workspace 1996").
Documentum Announces First Industrial-Strength Product for Web Content Management: Documentum RightSite™ assembles current and individualized information for diverse user needs,(Oct. 14, 1996) ("RightSite 1996").
Ovum Evaluation of Documentum (1996) ("Ovum Documentum 1996").
Ovum Evaluation of Interleaf(1996) ("Ovum Interleaf 1996").
De Mets, G., "Consleg Interleaf: SGML Applied in Legislation,"(1996) ("Consleg 1996").
Astoria: Information Repository & Management Infrastructure,(Apr. 1997) ("Astoria 1997-1").
XSoft Premieres Document Component Management System,(Mar. 1996) ("Astoria 1996").
Chrystal Software Recognizes that Organizations Want to Reach Out to the Consumers of Their Document Information,(1997) ("Astoria 1997-2").
Astoria Delivers a Complete Document Management System that Offers Powerful Tools to Search, Edit, Share, and Track Documents and Their Components,(1997) ("Astoria 1997-3").
XSoft, A Division of Xerox, Astoria (Jul. 12, 1996), found at http://xml.coverpages.org/duCharme-sgmldbms.html.
XSoft Premieres Astoria; A Simpler Way to Manage 'Mega-Documents', from PR Newswire (Mar. 12, 1996), found at http://www.highbeam.com/doc/1G1-8079234.html.
XSoft Astoria, found at http://www.architag.com/tag/Article.asp?v=10&i=4&p=8&s=1.
"Celebrating a Decade of SGML," SGML '96 Conference Proceedings, (Nov. 18-21, 1996).
Campbell, C. and McGurk, J., "Revising Statutes with Computer Support," 8 Statute Law Review 104 (1987).

Chang, E.E., et al., "The Design and Implementation of a Version Server for ComputerAided Design Data," 19 Software-Practice and Experience 199 (1989).
Corbett, M., "Indexing and Searching Statutory Text," 84 Law Library Journal 759-67 (1992).
Cunliffe, D., Taylor, C., Tudhope, D., Query-Based Navigation in Semantically Indexed Hypermedia, Proceedings of the Eighth ACM Conference on Hypertext HYPERTEXT '97 Publisher: ACM Press (Apr. 1997).
DeRose, S., Maier, E., Orchard, D., XML Linking Language (XLink) Version 1.0, W3C Proposed Recommendation (Dec. 20, 2000). [THOMOOI98594 THOMOOOO198627].
Dymalski, S., "InterleafTips and Tricks,"(1994).
Dynatext Software.
Edelweiss, N., de Oliveira, J.P., Pernici, B., "An Object-Oriented Approach to a Temporal Query Language," 5th International Conference, DEXA 225 (1994).
Elmasri, R. and Wuu, G., "A Temporal Model and Query Language for ERDatabases," Proceedings of the Sixth International Conference on Data Engineering 76 (1990).
Elmasri, R. et al., "The Time Index: An Access Structure for Temporal Data," Proceedings of the Very Large Data Bases Conference (VLDC) (1990).
Folio Views Software (See, e.g., Folio Views Infobase Production Kit Utilities Manual, Version 3.1, Provo, Utah: Folio Corporation (Jun. 1, 1994)).
Francois, P. "Generalized SGML Repositories: Requirements and Modeling," (1996). [THOMOOI98989-THOMOOI99002].
Fuller, M., Sacks-Davis, R., Wilkinson, R., "Presenting Query Results in a Hyperbase," (May 21, 1996). [SAIC000568-SAIC000577].
Goldfarb, C.F., "The SGML Handbook," (Feb. 28, 1991).
Greenleaf, G.et at, "Public Access to Law via Internet: the Australian Legal Information Institute," 6 Journal ofLaw (1995).
Guttman, A. "R-Trees: A Dynamic Index Structure for Spatial Searching," Proceedings of the ACM International Conference on the Management of Data (SIGMOD) (1984).
Haake, A, "Under CoVer: The Implementation of a Context Virtual Server for Hypertext Applications," ACM ECHT '94 Proceedings (1994).
Harold, E., "XML: Extensible Markup Language," (1990). [THOMOOI98945-THOMI98967].
Hoey, M., "The Discourse Properties of the Criminal Statue," in Computer Power and Legal, Walter (ed.) (1988).
HyTime Standard.
Kimball, R. and Strehlo, K., "Why Decision Support Fails and How to Fix It," ACM SIGMOD Record, vol. 24, No. 3, (Sep. 1995).
Kimball, R. "Is ER Modeling Hazardous to DSS?", DBMS, (Oct. 1995).
Kolovson, C.P. and Stonebreaker, M., "Indexing Techniques for Historical Databases," Proceedings ofthe IEEE Data Engineering Conference 127 (1989).
Kolovson, C.P. et al., S-Trees: Database Indexing Techniques for Multi-Dimensional Interval Data, Technical Report UCB/ERL M90/35, Electronics Research Laboratory, College ofEngineering, University ofCalifornia, Berkeley (1990).
Leung, R., "Versioning on Legal Applications Using Hypertext," City Polytechnic of Hong Kong.
Li, C. and Wang, S., "Efficient Storage Structures for Temporal Object-Oriented Databases," 5th International Conference, DEXA 246 (1994).
Lo, C. "Link and Versioning Management in an SGML Based Document Management System," (1996) [THOM00202985-THOM00203208].
Lum, Y. et al., "Designing DBMS Support for the Temporal Dimension," ACM SIGMOD Record, vol. 14, Issue 2 (Jun. 1984).
Maioli, C., Sola, S., Vitali, F., "Versioning Issues in a Collaborative Distributed Hypertext System,"Technical Report UBLCS-93-6 (Apr. 1993).
Merrick, F. (Australian Taxation Office) and Robertson, J. (Univ. of Tech.) "Proposal for Participation in the Workshop on Hypertext Systems and Version Support," Proceedings of the Workshop on Versioning in Hypertext Systems, at ACM European Conference on Hypennedia Technology (ECHT'94). http://web.archive.org/web/19991023013328/cs-pub.bu.edu/students/grads/dgd/workshop/robertson.html.
Rotem, D. and Segev, A., "Physical Organization of Temporal Data," Proceedings of the Third International Conference on Data Engineering 547 (1987).
Snodgrass, R. and Ilsoo, A, "A Taxonomy of Time in Databases," Proceedings of the ACM SIGMOD International Conference on Management of Data 236 (1985).
Spinellis, D., "The Design and Implementation of a Legal Text Database," 5th International Conference, DEXA 339 (1994).
Stonebraker, M., The Design of the Postgres Storage System (1987).
The ISO 8879 SGML Standard.
Travis, B., Waldt, D., "The SGML Implementation Guide: A Blueprint for SGML Migration," (1995). [THOM00204371-TH0M00204649].
Van Herwijnen, E. "Practical SGML, Second Edition," (1994).
Wagner, R. and Mansfield, R., "XML All-In-One Desk Reference for Dummies," (2003).
Whitehead, E. James, "Versioning in Hypertext Systems," (1999).
Wilkinson, R., Arnold-Moore, T., Fuller, M., Sacks-Davis, R., Thom, J., Zobel, J., "Document Computing: Technologies for Managing Electronic Document Collections," (1998).
Zizi, M., Beaudouin-Lafon, M., "Accessing Hyperdocuments Through Interactive Dynamic Maps," (1994), [THOM00I98637-TH0M00I98646].
Zobel, J., Wilkinson, R., Thom, J., Sacks-David, R., Macki, E., Kent, A., Fuller, M., "An Architecture for Hyperbase Systems Technical Report 42," (Jun. 1991) [THOM00206364-THOM00206378].
Article entitled "An SGML based hypertext information retrieval system" by Anthony Botham et al. Date is unclear. The latest ref it cites is 1992.
Article entitled "Efficient retrieval of Hierarchical structured data" by Justin Zobel et al.
Article entitled "Efficient retrieval of Structured Documents" by Ross Wilkinson et al.
Article entitled "A Formal Model of Databases of Structured Text" by Brian Lowe et al dated Sep. 1994.
Article entitled "SQL a data model and queyy language for structured documents" by Tim Arnold-Moore et al dated May 1, 1994.
Article entitled "Querying a large Hyperbase" by Michael Fuller et al undated. Latest reference cited is 1994.
Article entitled "Document computing technologies for managing electronic data collections" by Tim Arnold Moore et al undated.
Article entitled "Issues in the design and implementation of a hyperbase system" by Anthony Botham et al undated.
Article entitled "Simple Anaphoric Reference Resolution for Document Retrival" by Michael Fuller et at undated. Latest ref cited is 1990.
System Architecture for Structured Document Data by Tim Arnold Moore.
An Architecture for Hyperbase systems by Justin Zobel et al.
Integrated Access to Large Document Collections Michael Fuller thesis for his applied Science Degree.
Approaches for Structured Document Management by Tim Arnold Moore.
Presenting Query Results in a Hyperbase by Michael Fuller.
Structured Answers for a large Structured Document Collections by Michael Fuller et al.
Architecture of a content management server for XML Document Application by Tim Arnold Moore et al.
Asset Management, SGML and Database publishing Recapping Seabold 1997.
What you do or don't need hy-time in your document management system. Article by Angerstein Paula published on www.infoloom.com.
Arbortext to offer breakthrough technology for virtual document creation and delivery on paper CD Rom and web. Published on oasis-open.org.
Slowly changing dimensions(Data warehouses can track historical data)(Data warehouse architect)(Technology tutorial)(column) Kimball Ralph published by the Gale Group.

Indexing temporal data using existing B+-trees by Chen Hian Goh et al.

Status Report on SGML Notes from SGML '93 by Walter Mark (Seabold Report).

Hy-time Hypermedia time based Document Structuring Language Stephen Newcomb et al.

About time Legislation's forgotten dimension by Tim Arnold Moore.

Ashman, Helen, Electronic Document Addressing: Dealing with Change. University of Nottingham, ACM Computing Surveys, vol. 32, No. 3, Sep. 2000, p. 201-212.

Prevelakis, Vassilis, A Framework for the Organization and Dynamic Reconfiguration of the World Wide Web, University of Geneva, Aug. 1996.

Sacks-Davis et al., The Structured Information Manager (SIM), ACM 1998.

Sacks-Davis, The Structured Information Manager: A Database System for SGML Documents, Proceedings of the 22nd VLDB Conference, 1996.

Lee et al., Management of Multi-structured Hypermedia Documents: A Data Model, Query Language, and Indexing Scheme, Kluwer Academic Publishers, May 1, 1991.

Cowan et al., Enhancing Code for Readability and Comprehension Using SGML, IEEE 1994.

Poulin et al., The Other Formalization of Law: SGML Modelling and Tagging, Undated.

Deposition Transcript of Timothy J. Arnold-Moore Ph.D. including Exhibits 1-9, 14-18 for for *Timebase Pty Ltd.* v. *The Thomson Corp.*, Case No. 07 CV 1687 (D. Minn) Jun. 22, 2010.

Deposition Transcript of Christoph Schnelle including Exhibits A.M. 2, A.M.3, A.M.14, 123, 125, and Schnelle 1-5 for *Timebase Pty Ltd.* v. *The Thomson Corp.*, Case No. 07 CV 1687 (D. Minn.) Aug. 11, 2010.

Deposition Transcript of Nicola Jane Lessing including Exhibits 59-61, 95, 113-117, 119, and 120 for *Timebase Pty Ltd.* v. *The Thomson Corp.*, Case No. 07 CV 1687 (D. Minn.) Aug. 10, 2010.

Berners, uniform Resource Identifiers (URI): Generic Syntax, Aug. 1998, RFC 2396, pp. 1-41.

Communication from Applicant Responsive to Jul. 25, 2002 Search Report in EP 98901249.7, Oct. 1, 2002.

Communication from Applicant Responsive to Sep. 8, 2005 Communication in EP 98901249.7, Sep. 19, 2005.

Communication from Applicant Responsive to Jan. 25, 2007 Communication in EP 98901249.7, Apr. 5, 2007.

Communication from Applicant Responsive to Apr. 23, 2007 Communication in EP 98901249.7, Jun. 25, 2007.

DeRose et al., XML XLink Requirements Verision 1.0, Feb. 1999, W3C, pp. 1-15.

Dayen, Igor, "Storing XML in Relational Databases", XML.com, www.xml.com/lpt/a/803, Jun. 20, 2001, pp. 1-13.

Hyper Media Database.

Office Action of Corresponding European Appl. No. 98 901 249.7-1527, Jan 28, 2005.

Office Action of Corresponding European Appl. No. 98 901 249.7-1527, Feb. 27, 2008.

Third Party Observation Under Article 115 EPC filed Apr. 18, 2007 in EP 98901429.7.

Third Party Observation Under Article 115 EPC filed Nov. 23, 2006 in EP 989014297.

XML-Sitemaps, Find and Fix Broken Links, 2005-2008, XML-Sitemaps, pp. 1-8.

Xsoft Astoria—http://www.architag.com/tag/Article.asp?v=10&i=4&p=8&s=1.

Xsoft Premieres Astoria: A simpler way to mange "Mega-Documents" dated Mar. 12, 1996—http://www.highbeam.com/doc/1G1-18079234.html.

Xsoft, A division of Xerox updated Jul. 12, 1006—http://xml.coverpages.org/duCharme-sgmldbms.html.

Helen Ashman, Electronic Addressing: Dealing with Change. Sep. 2000, ACM, pp. 201-212.

Lee et al., CPI: Constraints-Preserving Inlining Algorithm for Mapping XML DTD to Relational Schema, Google 2001, pp. 3-25.

Web page printout of URL http:..www.xml.com/pub/a/2001/06/20/database.html, Jun. 2001.

Morrison Michael et al. XML Unleashed, Sam's Publishing Indianapolis, IN, Dec. 1999, pp. 398-415, 482-489, 506-507 and 518-519.

"DB2 Universal database XML Extender: Web-Enabling Your Data with XML", IBM product information sheet 2000, 2 pages.

Baru, Chaitanya, "Xviews: XML Views of Relational Schemes" San Diego Supercomputer Center Technical Report, SDSC TR-199-3, Oct. 1999, 18 pages.

Sturm, Jake, Developing XML Solutions, Microsoft Press, Redmond, WA 2000, pp, 287-289, 347-348 and 359-366.

Harold, Elliotte Rusty, XML: Extensible Markup Language, IDG Books Worldwide. Inc., Foster City, CA 1998, pp. 32-39, 57-59, 66-70 and 96-99.

Adrenne Azaria "SGML: A Lifesaver in a Sea of Electronic Documents." Network World, 11/50, Dec. 12, 1994.

Legal Database program entitled STATUS Utilizing Folio Bound Views, Pub. 1994.

Dayen, Igor, "Storing XML in Relational Databases", XML.com, www.xml.com/lpt/a/803, Jun. 20, 2001.

DeRose, W3C: XML Linking Language Xlink, Dec. 20, 2000, W3C, Version 1.0. pp. 1-27.

Arnold-Moore, Timothy and Sacks-Davis, Ron; Databases of Legislation: the Problems of Consolidations, Collaborative Information Technology Research Institute, May 15, 1994.

Freeman, Simon and Callum, Euan; A Brief History of Time Travel; Legal Information Management 4 (2004) pp. 28-30.

Lim et al., "An Automated Approach for Retrieving Hierarchical Data from HTML Tables", CIKM '99, Nov. 1999, Kansas City, MO, USA, pp. 466-474.

Eisenberg et al., "SQL/XML is Making Good Progress", SIGMOD Record, vol. 31, No. 2, Jun. 2002, pp. 101-108.

Promenschenkel, "STEPS: toward a new era in electronic publishing", OCLC Newsletter, Jul./Aug. 1995, No. 216, found at website: http://digitalarchive.oclc.org/da/ViewObjectMain.jsp;jsessionid=84ae0c5fi82409328f8d87a14475bd40eaaceff43afd?fileid=0000001695:000000042504&reqi.

Kim et al., "OOHS: An Object-Oriented Hypermedia System", COMPSAC, Seoul, KR, Aug. 21, 1996-Aug. 23, 1996, pp. 496-501, IEEE, XP 000684382, IEEE Comp. Soc. Los Alamitos, CA US ISBN: 0-8186-7579-9.

Arnold-Moore at al., "The ELF data model and SGQL query language for structured document databases", Sixth Australasian Database Conf., ADC'95, Adelaide, AU, [Online] vol. 17, No. 2, Jan. 30, 1995-Jan. 31, 1995, pp. 17-26, XP002204886, Australian Computer Science Communications ISSN: 0157-3055 Retrieved from the Internet: URL:http://www.mds.rmit.edu.au/~tja/papers/index.html>.

P. Francois, "Generalized SGML repositories: Requirements and modeling", Computer Standards and Interfaces, vol. 18, No. 1, 1996, pp. 11-24, XP004006104, Elsevier Sequoia, Lausanne, CH ISSN: 0920-5489.

WR Communication pursuant to Article 115(c) EPC, Nov. 30, 2006.

Wang, Wen Qiang, et al., "XstorM: A Scalable Storage Mapping Scheme for XML Data", World Wide Web, vol. 4 Nos. 1-2, Mar. 2001 pp. 101-119.

Zhu, Yan, et al., "Data Transformation for Warehousing Web Data", WECWIS 2001, Jun. 21-22, 2001, pp. 74-85.

Eckhert, "Processing Hypertext Links after Xlink", 2004, pp. 1-58.

McFall et al. "Automaticall Finding and Repairing Broken Lings Between XML Documents" Dec. 1998, Department of Computer Science, Michigan State University, pp. 1-18.

Davis, "Hypertext Link Integrity", Dec. 1999, pp. 1-6.

Ducharme, "Links that are More Valuable than the Information they Link", Jul. 25, 1998, xml.com pp. 1-3.

Lowe et al. "Improving Web Linking Using Xlink", Jul. 2001, pp. 1-19.

Simpson, "Top Ten Tips to Using Xpath and Xpointer", Aug. 21, 2002, xml.com, pp. 1-12.

Duhig, "Separating Links Content using XML, Xlink and Xpointer", May 2001, Internationanales Congress Centrum (ICC), pp. 1-19.

Maler, "XML and Broken Links (How can the XML Pointer Language, Xlink and Xpointer help solve the problem of Broken Links of the Net?", Mar. 1998 p. 1.

Fong et al. "Converting Relational Databases into XML Document", IEEE 2001, pp. 61-65.

Nambiar et al., "Current Approaches to XML Management", IEEE 2002, pp. 43-51.
Khan et al., "A performance Evaluation of Storing XML Data in Relational Database Management Systems", ACM 2001, pp. 31-38.
Shanmugasundaram et al., "Efficiently Publishing Relational Data as XML Documents", Google Apr. 2001, pp. 133-154.
http://www.sweetandmaxwell.co.uk/westlaw/pdfs/user_guide.pdf, 2006.
http://www.sweetandmaxwell.co.uk/about/history.html, 2003.
http://www.complinet.com/home/about, 2006.
http://www.sweetandmaxwell.co.uk/westlaw/about.htm, 2006.
http://www.butterworths.com/about/index.htm, 2000.
http://www.complinet.com/home/share/pdf/news_rules/uk/companylaw_NR_insert.pdf, 2006.
http://www.complinet.com/home/news_rules/.
http://www.pendragon.co.uk/perspective, 2001.
http://www.pendragon.co.uk/perspective/perspective2.htm, 2001.
http://www.pendragon.co.uk/perspective/perspective3.htm, 2001.
Search Report of Corresponding European Appl. No. 98 901 249.7-1527, Jan. 28, 2005.
Communication pursuant to Article 115(c) and responsive to "WR Communication pursuant to Article 115(c) EPC, Nov. 30, 2006" EPC, Jan. 26, 2007.
Arnold-Moore et al. "Models for Structured Document Database Systems", Royal Melbourne Institute of Technology, 1998.
Arnold-Moore, "Automatic Generation of Amendment Legislation", ACM 1997.
Arnold-Moore et al. "Connected to the Law: Tasmanian Leg slat on Using EnAct", InQuirion Pty Ltd., 2002.
Sacks-Davis et al. "Database Systems for Structured Documents", International Symposium on Advanced Database Technologies and Their Integration, Japan, 2002.
Sacks-Davis et al., "A Standards-Based Approach to Combining Information Retrieval and Database Functionality", International Journal of information Technology, 1(1):1-15, 1995.
Arnold-Moore, "Automatically, Processing Amendments to Legislation", ACM 1995.
Jan. 18, 2007 letter enclosing website entitled "The Information Society Creative Awards 1996", available at: http://met.open.ac.uk/isca/, 1996.
ActiveTEXT Datasheet, available at: http://web.archive.org/web/19970630042435/www.ais.co.uk/atds,html, 1997.
Jan. 19, 2007 letter in response to Jan. 18, 2007 letter enclosing website entitled "The Information Society Creative Awards 1996", available at: http://met.open.ac.uk/isca/, 1996.
Office Action of Corresponding European Appl. No. 98 901 249.7-1527, Jan. 25, 2007.
Maioli C. et al., "Versioning Issues in a Collaborative Distributed Hypertext System" Technical Report Universita Di Bologna, Apr. 1993.
Reexamination Request from US Patent No. 6,233,592; Jan. 29, 2007.
Order Granting Reexamination Request from US Patent No. 6,233,592, Apr. 3, 2007.
*TimeBase Pty Ltd* v. *The Thompson Corp.*, U.S. District Court for the Northern District of Illinois, Complaint filed Jan. 24, 2007.
Michael Morrison et al. (XML Unleashed, Sam's Publishing, Indianapolis, In, Dec. 1999, pp. 398-415, 482-489, 506-507 and 518-519).
The Premise software ("Premise Software") on CD Labeled THOM00194621.
A sample Premise dataset: Annotated California Codes from 199X ("Premise Statutes") on CD Labeled THOM00194622-23.
Law Desk NY Official Reports, 2nd Series, Lawyers Cooperative Publishing (1995) ("NY Official Reports") on CD Labeled THOM00213522-24.
New York Consolidated Laws Service, Lawyers Cooperative Pub. Co. (1992) ("NY CLS Beta") on CD Labeled THOM00213530.
Social Security Plus, Version 1.1, Clark Broadman Callaghan (Nov. 1994) ("Social Security Plus") on CD Labeled THOM00213521.
RIA OnPoint CD-ROM Tax Library, Research Institute of America (1992) ("OnPoint") on CD Labeled THOM00213529.
Core Materials on Legal Ethics: An Electronic Publication of the Legal Information Institute Cornell Law School, Cornell University (1995) ("Core Materials on Legal Ethics") on CD Labeled THOM00213536.
New Mexico Law on Disk, The Michie Company (1991) ("New Mexico Law") on CD Labeled THOM00213527.
Federal Rules of Civil Procedure, Cornell University (1995) ("Federal Rules of Civil Procedure") on CD Labeled THOM00213532-33.
Uniform Commercial Code, Disk #1, Articles 1,2,3: An Electronic Publication of the Legal Information Institute of Cornell Law School (1995) ("UCC") on CD Labeled THOM00213531.
Law Desk NY Official Reports, 2d Series, Lawyers Cooperative Publishing (1995) ("Law Desk NY") on CD Labeled THOM00213528.
Law Desk United States Code Service Titles 1-50, US Constitution, Court Rules, Tables, 4th Quarter 1995, Lawyers Cooperative Publishing (1995) ("Law Desk USCS") on CD Labeled THOM00213525.
"Cyclic cvsweb page" Cyclic Software, Archive Jan. 27, 1998 http:www.cyclic.com/cyclic-pages/web-cvsweb.html Fenner, William, cvs © 1996.
http://web.archive.org/web/19991007082542/http://www.freebsd.org/%7Efenner/cvsweb/cvsweb-1.0.tar.gz, cvsweb.
Memorandum dated Oct. 7, 2011 for *Timebase Pty Ltd*. v. *The Thomason Corp.*, Case No. 07 CV 1687 (D. Minn.).

* cited by examiner

*Figure 1 — Sample XML Document Fragment*

```
<chapter shortref="Ch 3">
    <label>3</label>
    <desc sdate="1996-07-15">Directors' Responsibilities</desc>

<part shortref="Ch 3, Pt A">
        <label>A</label>
        <desc sdate="1996-07-15">Common Law</desc>

<section shortref="s 56">
            <label>56</label>
            <p> ... </p>

<note>
                <p> ... </p>
            </note>
        </section>

<section shortref="s 56A">
            <label>56A</label>
            <p> ... </p>
        </section>

<note>
            <p> ... </p>
        </note>
    </part>

<part shortref="Ch 3, Pt B">
        <label>B</label>
        <desc sdate="1996-07-15" edate="2001-03-22">
            Corporate Governance Act</desc>
        <desc sdate="2001-03-23">
            Corporate Governance and Disclosure Act</desc>

<section shortref="s 57">
            <label>57</label>
            <p> ... </p>
        </section>

</part>

</chapter>
```

*Figure 2 — SQL Node Table*

| node_id | level | label | shortref |
|---|---|---|---|
| 300 | chapter | 3 | Ch 3 |
| 310 | part | A | Ch 3, Pt A |
| 311 | section | 56 | s 56 |
| 312 | section | 56A | s 56A |
| 320 | part | B | Ch 3, Pt B |
| 321 | section | 57 | s 57 |

*Figure 3 — SQL Content Table*

| node_id | block_id | content |
|---|---|---|
| 300 | 0 | chapter 3 intro |
| 310 | 0 | part A intro |
| 311 | 0 | section 56 text + note |
| 312 | 0 | section 56A text |
| 310 | 313 | note at end of part A |
| 320 | 0 | part B intro |
| 321 | 0 | section 57 text |

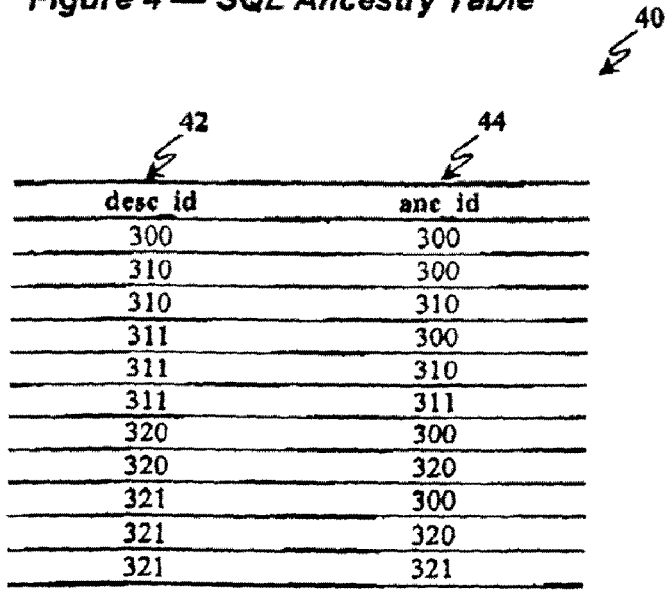
Figure 4 — SQL Ancestry Table
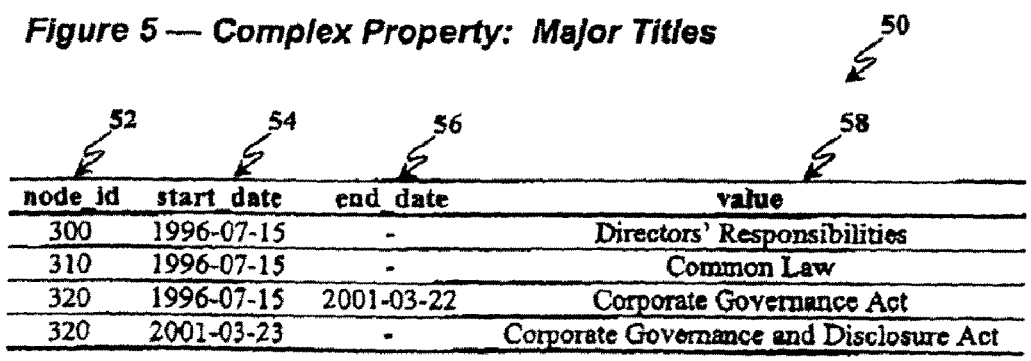
Figure 5 — Complex Property: Major Titles

MAPPING OF DATA FROM XML TO SQL

CROSS REFERENCE TO RELATED APPLICATIONS

This application is a continuation of U.S. application Ser. No. 12/073,511, filed Mar. 6, 2008, which is a continuation of U.S. application Ser. No. 10/233,991, filed on Sep. 3, 2002, which claims the benefit of U.S. Provisional Application No. 60/317,038, filed on Sep. 4, 2001. Each one of these applications is incorporated herein by reference in their entirety.

TECHNICAL FIELD OF THE INVENTION

The present invention relates generally to electronic documents and, in particular, to the storage, maintenance and publication of complex text-based datasets.

BACKGROUND

International Publication No. WO 98/34179 (PCT/AU98/00050) in the name of Time Base Pty Ltd and published on 6 Aug. 1998 and counterpart U.S. Pat. No. 6,233,592 issued on 15 May, 2001 to Schnelle et al. are incorporated herein by cross reference. In these documents, an electronic publishing system is disclosed that provides a sparse multidimensional matrix of data using a set of flat file records. In particular, the computer-implemented system publishes an electronic publication using text-based data. Predefined portions of the text-based data are stored and used for the publication. At least one of the predefined portions is modified, and the modified version is stored as well. The predefined portion is typically a block of text, greater in size than a single word, but less than an entire document. Thus, for example, in the case of legislation, the predefined portion may be a section of the Act. Each predefined portion and the modified portion(s) are marked up with one or more links using a markup language, preferably SGML or XML. The system also has attributes, each being a point on an axis of a multidimensional space for organising the predefined portions and the modified portion(s) of the text-based data. This system is simply referred to as the Multi Access Layer Technology or "MALT" system hereinafter.

Australian Patent Application No. 65470/00 filed on 12 Oct., 2000 in the name of TimeBase Pty Ltd. Canadian Patent Application No. 2323245 filed on 12 Oct., 2000 in the name of TimeBase Pty Ltd, New Zealand Patent Application No. 507510 filed on 12 Oct., 2000 in the name of TimeBase Pty Ltd and U.S. patent application Ser. No. 09/689,927 filed on Oct. 12, 2000 in the names of Lessing et al. are incorporated herein by cross reference.

U.S. patent application entitled "Resilient Data Links" filed on 18 Jul., 2001 in the names of Schnelle and Nolan is also incorporated herein by cross reference. In this document, a method, an apparatus and a computer program product for providing one or more resilient links in an electronic document are described. The methodology disclosed is referred to as "MALTlink" hereinafter.

Large or complex text-based datasets are typically hierarchical in nature. In the storage, maintenance and publication of such data, it is common to use a markup language capable of describing such hierarchies. XML is one such markup language that is more commonly used, particularly in the print, electronic or online publishing industries, and for government or public records or technical documentation. XML data is stored typically either in "flat" text files encoded in ASCII, Unicode, or other standard text encoding, or in a "native" XML database.

The flat text files may be part of a document management system. Such a document management system may be based on a relational database. Document management systems deal with a document as a whole and are able to store relevant data about each document. However, document management systems are typically not designed to operate on data (XML elements) within such documents. Consequently, a document management system does not typically operate on all (or even a substantial number of the) XML elements contained in flat text files on which the document managing system is operating. An XML database, in contrast, operates on all XML elements of the XML data that the XML database is storing and, consequently, XML databases must manage large amounts of data and detail. As a result, document management systems have a limited usefulness resulting from a lack of precision and XML databases are overwhelmed by the multiplicity of XML elements that are to be managed.

Attempts have been made to transform XML data into a set of SQL relational database tables. SQL is a database technology that provides a user with powerful query functionality and powerful data management tools. SQL possesses the stability of a mature technology, whereas XML databases are still a relatively immature technology, and thus possess a degree of instability. SQL is a fast and efficient technology, and a wide choice of software and hardware manufacturers offer or support SQL databases.

Tree mapping techniques are typically used to convert XML data into relational databases. Conventional tree mapping techniques, however, often attempt to capture all of the document hierarchy. This is almost never necessary and can result in substantial size and performance penalties in the resulting SQL tables. Such tree mapping techniques typically result in a far larger number of SQL tables than is necessary.

As an example, consider the XML fragment shown in FIG. 1. A classical approach to conversion is to represent the element tree with one table per element type, possibly with an added table to store the tree structure. A correct, and possibly even reversible, outcome results. However, the performance and management advantages (which prompted the conversion in the first place) can be diminished or even lost entirely, because of the size and complexity of the resulting tables.

Thus, a need exists for providing an efficient method for converting an XML document to a set of SQL tables.

SUMMARY

According to a first aspect of the invention, there is provided a computer implemented method for converting an XML encoded dataset into a minimal set of SQL tables including the steps of:

identifying at least one hierarchical structure in said XML encoded dataset; and converting an XML encoded dataset associated with each identified hierarchical structure, wherein for each identified hierarchical structure said converting step includes the further steps of:

determining a node element set for said identified hierarchical structure of said XML encoded dataset, wherein each node element in said node element set is a discrete level of said identified hierarchical structure of said dataset;

determining one or more nodes of said XML encoded dataset each node being an instance of a node element;

allocating to each node a unique node identifier; and generating an SQL node table containing one or more records, each record corresponding to a respective one of said allocated node identifiers.

According to a second aspect of the invention, there is provided an apparatus for converting an XML encoded dataset into a minimal set of SQL tables, the apparatus including:

a device for identifying at least one hierarchical structure in the XML encoded dataset; and a device for converting an XML encoded dataset associated with each identified hierarchical structure, the device including:

a device for determining a node element set for the identified hierarchical structure of the XhML encoded dataset, wherein each node element in the node element set is a discrete level of the identified hierarchical structure of the dataset;

a device for determining one or more nodes of the XML encoded dataset, each node being an instance of a node element;

a device for allocating to each node a unique node identifier; and a device for generating an SQL node table containing one or more records, each record corresponding to a respective one of the allocated node identifiers According to another aspect of the invention there is provided a computer program product including a computer readable medium having recorded thereon a computer program for implementing the method described above.

BRIEF DESCRIPTION OF THE DRAWINGS

One or more embodiments of the present invention are described hereinafter with reference to the drawings, in which;

FIG. 1 shows a sample XML document fragment;

FIG. 2 shows a corresponding SQL node table for the XML fragment of FIG. 1;

FIG. 3 shows a corresponding SQL content table for the XIML fragment of FIG. 1;

FIG. 4 shows a corresponding SQL ancestry table for the XML fragment of FIG. 1;

FIG. 5 shows a corresponding SQL table of complex properties for the XML fragment of FIG. 1.

DETAILED DESCRIPTION

Figure 6:
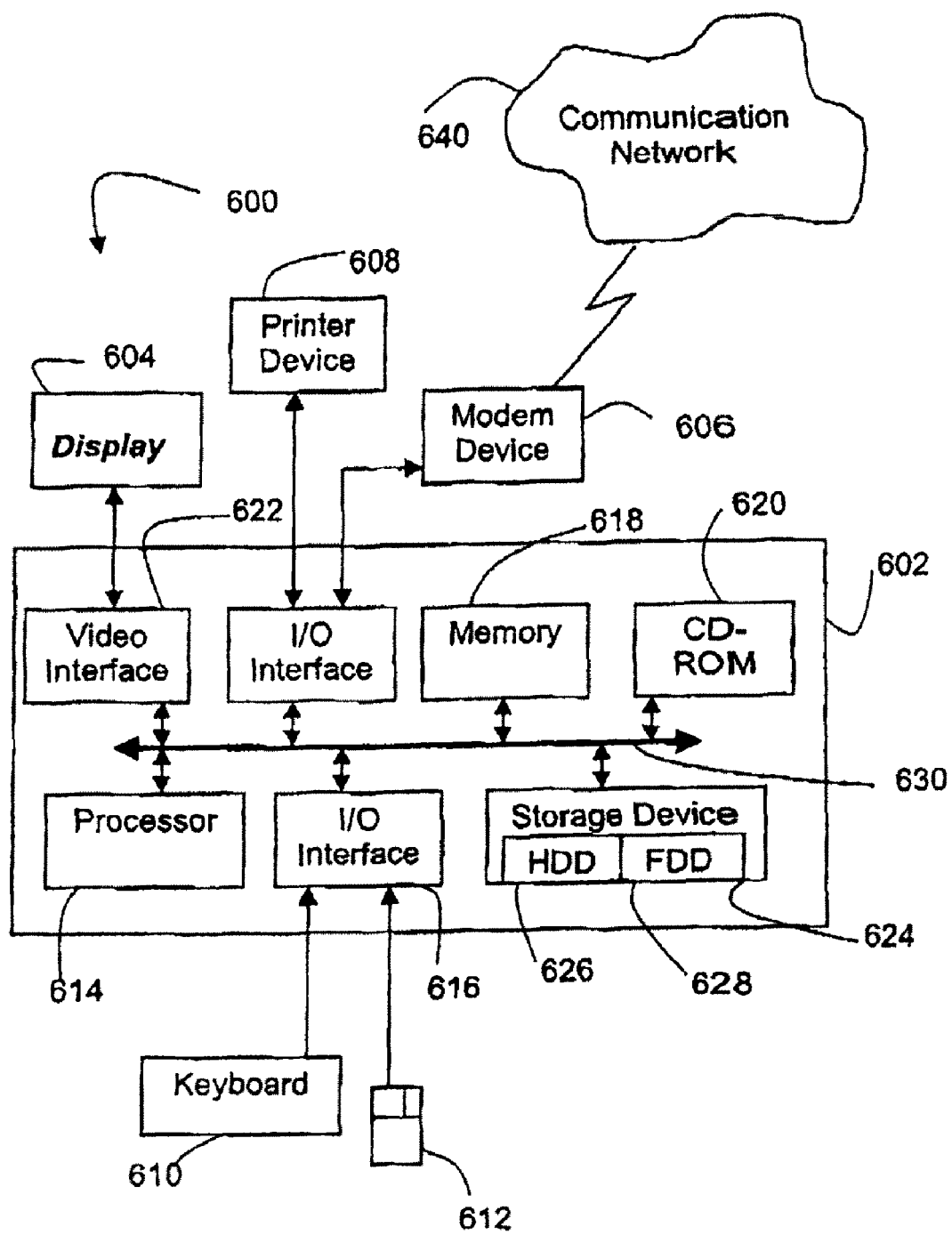
FIG. 6 is a schematic block diagram representation of a general-purpose computer system on which a method for converting ML data into SQL tables may be practised.

A method, an apparatus and a computer program product for converting an XML document into a set of SQL tables are described. In the following description, numerous details are set forth. It will be apparent to one skilled in the art, however, that the present invention may be practised without these specific details. In other instances, well-known features are not described in detail so as not to obscure the present invention.

Where reference is made in any one or more of the accompanying drawings to steps and/or features, which have the same reference numerals, those steps and/or features have for the purposes of this description the same function(s) or operation(s), unless the contrary intention appears.

A method of conversion should preferably produce an SQL rendition of an XML dataset that preserves document order, hierarchy, and other links and relationships which are deemed necessary. The required links and relationships may be all of the links and relationships inherent in the XML data, or only a subset of these required to support a particular application, such as Web publishing. Such a method of conversion should also limit the number of tables and records, and the amount of real time processing required by downstream applications, to the minimum consistent with the required functionality.

In the embodiments of the invention, the granularity of the conversion of an XML document to an SQL table is matched to the requirements of those applications that access the SQL output. To this end, the large scale structure of the data is mapped into a set of nodes and properties. Structure below this level is simply pre-processed into a form suitable for direct use by end applications, including:

the back end of a Web site, for online publication of the data; and an XML editor, for ongoing maintenance of the data, in which case there may be no pre-processing apart from dividing the data into appropriate segments, one segment being the marked-up content of one node.

The actual pre-processing that is performed is dependent upon the accessing application. If an accessing application performs all the processing, such as may occur with an XML editor, no pre-processing is required. Alternatively, the data may be rendered into HTML or XHTML for web publishing or the data may be converted into MS Word for word processing. The data may even be converted into multiple formats: XML, XHTML, Word, Adobe Acrobat, Postscript for printing etc.

The conversion process consists of determining all hierarchical structures present in the dataset under consideration, and for each identified hierarchical structure the following steps are performed:

1. Ascertain the optimal node element set;

2. Assign a unique ID to each node;

3. Convert content, dependent upon an accessing application;

4. Construct node, block content, and ancestry tables; and

5. Create complex property tables where required.

The fundamental underlying principle of the conversion strategy, and what sets the strategy apart from other XML to SQL conversion systems, is the concept of operating at a node level, rather than operating on a base element level of the dataset to be converted. A node is a distinguished structural unit of the dataset. A dataset is a set of data possessing complex structure that may be rendered in a number of various formats. Such formats may include an XML document or SQL tables. A node is a discrete unit of data, within which an internal structure may be pre-processed to maximize performance of downstream applications. Typically, a node is introduced by one of a set of specified XML tags (the node element set).

A node may be associated with a predefined portion described in the aforementioned MALT system. Dividing a dataset into a number of nodes removes the need for downstream applications to assemble the required data (usually anode) from various elements. The conversion of data to an appropriate format, such as XHTML or HTML for web applications, means the webserver (if that is the downstream application) does not need to convert the XML data for browser clients that cannot accept XML directly or where the publisher decides not to provide a browser (even if it is XML capable) with XML data for security reasons. Such a situation may result as XML data may incorporate more features than HTML and a publisher may not want a customer to be able to recreate the XML dataset.

The levels within the structure of the information that are regarded as functionally significant by the creators and end users of the dataset must be identified. Inspection of the example indicates that:

{chapter, part, section} is a likely candidate for a node element set. In general, the node tags are preferably supplied to the conversion software, but a (possibly sub-optimal) node element set can be generated automatically. The lowest level of the hierarchy that is selected in the node element set is known as a terminal node element. The remaining nodes are referred to as non-terminal (or higher level) nodes.

The selection of a suitable terminal node element is significant, as documented in the International Publication No. WO 98/34179 (PCT/AU98/00050) and U.S. Pat. No. 6,233,592 pertaining to the MALT system. A good rule of thumb is to take the element that is most often cited by users when referring to a single atom of information within the dataset. In the example of legislation, the most often cited element is usually a section. For multiple document types in a single dataset, the definition of nodes may be more or less complex, depending on the degree to which the document types are comparable.

A principal determinant of the complexity of the nodes is the record structure adopted for each record associated with a predefined portion. For example, consider a dataset consisting of multiple document type definitions (DTDs) for legislation: a first DTD for old style textual legislation and a second DTD for new style legislation that incorporates examples and graphics. The document types are sufficiently similar to allow the application of a common node element set, for example {chapter, part, section}. A further example is a dataset consisting of multiple DTDs for case law: a first DTD for reports and a second DTD for practice notes. The documents need only be sufficiently similar to allow the application of the same node element set and conversion strategy for all documents in the dataset. In the case law example, a suitable node element set might be {jurisdiction, year, court, casereport, pracnote, judgment}. The common elements shared by the different document types enable a relatively simple definition of node elements to be applied to disparate sets of data. In such situations, the definition of nodes may not be too complex as the document types share common features. A principal determinant is the choice of a terminal node element. The levels of the hierarchy that constitute the remainder of the node element set are also associated with predefined portions. Thus, there may be multiple predefined portions in a single XML dataset.

When dealing with multiple predefined portions in a single dataset, each terminal portion is duplicated when it changes in any degree. Non-terminal (higher level) portions typically contain no variable content except for a title, any other variable content being delegated to terminal sub-portions. While the title itself may be regarded as a degenerate sub-portion, it is usually more efficient to add special handling of titles to the conversion process (e.g. by reserving a separate table for title fields).

With no variable content, and title changes handled separately, the only substantive change which can apply to a non-terminal portion (apart from creation and deletion) is a structural change. For example, a legislative part may be converted into a chapter, or moved from one chapter to another. In this case the entire portion, including all contained sub-portions, must be duplicated at the new location in the hierarchy.

One table of nodes may possibly be used for two or more document types in the following circumstances:

(a) if the terminal nodes in each document type can be regarded as functionally equivalent, regardless of whether the element names are identical and regardless of the terminal nodes' respective positions in the hierarchy of the document type; and (b) if the record structure for each node is equivalent (e.g. each node, however named, has an ID, dates when the node was applicable, a label and title). An example is Commonwealth Acts and Commonwealth Regulations, where the node can be for both sections of Acts and regulations of Regulations.

In certain cases, multiple document types may preferably, or even desirably, be represented in multiple node tables. Such situations might include:

where the production cycle of each document type cannot be sufficiently synchronized to permit the simultaneous output of all nodes from all document types; or where end users typically access material from different document types using different methods for each, An example is Commonwealth Acts and Commonwealth case law (judgments).

If, for example, legislation and case law are incorporated in a single dataset, there may be two different hierarchical structures. It may be preferable, or even necessary, to define a node element set and a corresponding node table for each of tie hierarchical structures involved.

Each node consists of the following components:

node ID;

properties (order independent metadata represented by specified attributes or sub-elements);

sub-nodes (subordinate nodes);

initial content (any non-property content prior to the first sub-node); and block content (content after the first sub-node).

A node ID is a value that uniquely identifies a node and specifies the node's position in a dataset. A property is a descriptive attribute of a node that may be derived (in) XML) from a node tag (name or attributes) or nominated sub-elements. A simple property is a property that can take at most one value per node. A complex property is a property that may have multiple values for the same node. A sub-node is anode that forms part of the content of an enclosing node. A terminal node is a node that cannot contain sub-nodes. A node element set is the set of XML elements that introduce a new node. Content is defined to be the information associated with anode other than the node's properties. Initial content is the content of a node prior to any sub-nodes. Block content is the content of a node between sub-nodes or after the last sub-node.

An optimal node definition produces a set of nodes with comparable internal structure. For example, the nodes defined for FIG. 1 all have a label property. The nodes are desirably defined so that the number of non-initial content blocks is kept to a minimum.

The dataset in the example of FIG. 1 has only one content block, namely the note at the end of Part A. While belonging to the part, the note follows sections 56 and 56, which are (sub-)nodes in their own right. The note in section 56 is not a content block, because the note is not preceded by a sub-node. Rather, the note forms part of the initial content of that section.

Once anode set is established, each data node (and non-initial content block) is assigned an arbitrary node ID. This ID is typically an integer with the following properties:

each node or content block has exactly one, unique ID; and anode (or block) with a lower ID always precedes anode with a higher ID in document order.

The node IDs need not form an unbroken sequence. It is sufficient that the node IDs be unique and reflect document order. When SQL conversion is complete, the node ID can act as a unique key to each node and content block. Initial content always inherits the ID of the initial content's containing node, and so does not require a separate ID.

Simple properties are those which can take at most one value per node. These properties can be derived from three sources:
- the name of the node element (see the level property in the example);
- the attributes of the node element (the shortref property); and
- the attributes or content of a unique sub-element (the label property).

To maximize performance of the resulting SQL dataset, all XML data except node tags and properties are converted into content fields. These content fields are typically text strings and may be marked in XML, HTML, or any other format required by the end application. Because content (which usually comprises the overwhelming bulk of the dataset) is pre-processed once, only operations relating to nodes as a whole need to be performed "on the fly".

Thus, in the example, all of the <p> paragraph and <note> elements (and any internal markup) are pre-processed into content blocks, and so do not have to be dealt with in real time. Note that initial content and other block content undergoes identical conversion, but must be appropriately flagged in the content SQL table (see below).

For each document type, or group of equivalent document types, a corresponding node table has one record per node, and the following fields:
- node_id—the unique node ID assigned to the current node; and
- one field for each simple property of the current node (e.g. label in the example).

FIG. 2 illustrates a node table corresponding to the FIG. 1 dataset. Each node has a corresponding record in the node table 200. Each record in the node table 20 contains a first field 22 for the node_id, a second field 24 designating the type of node element, designated "level", a third field 26 for a label and a fourth field 28 for a short reference, designated "shortref". In the example, Chapter 3 is defined to be a node of level "chapter" having a node_id 300, a label "3" and a shortref "Ch 3". Similarly, Section 56 is defined to be a node of level "section" having a node_id 311, a label "56" and a shortref "s 56".

The minimum number of SQL tables required to represent an XML encoded dataset is one. However, utilising a single table would require a large number of columns, many of which would be sparsely populated. It is known that relational databases perform sub-optimally in such situations. Accordingly, it is preferable to convert an XML dataset into a single SQL node table and a minimum set of ancillary SQL tables. Presenting the data in multiple tables allows the data to be accessed in multiple ways, often resulting in improved performance. Presenting the data in a minimum set of compact tables simplifies the management of the data. A single, sparsely populated table can be unwieldy and cumbersome. For this reason, an exemplary embodiment typically utilises content and ancestry tables.

Converting each element in a dataset to a corresponding table (as it is currently done by IBM, Oracle, Microsoft and Sybase) results in an overly complex product, The pre-processed content (both initial and block) is stored in a content table with the following fields:
- node_id—the ID of the containing node;
- block_id—the ID of the content block (or 0 for initial content); and
- content—the pre-converted content string.

A content block inherits properties from the containing node. FIG. 3 illustrates a content table 30 corresponding to the FIG. 1 dataset. Each record in the content table 30 contains a node_id field 32 that allows the content table 30 to be correlated with the node table 20. Each record in the content table 30 also contains a block_id field 34 and a content field 36. It can be seen from the content table 30 that the Chapter 3 node, having a node_id of 300, also has a block_id of 0 and a content field "chapter 3 intro".

A node may have more than one associated record in the content table 30. For example, node_id 310 is associated with Part A of the legislation XML fragment of FIG. 1. There are two records in the content table 30 having a node_id of 310. The first record indicates that the node_id 310 has a first associated block_id 0 with content "part A intro". The second record indicates that node_id 310 contains a second associated block_id 313 with content "note at end of part A".

The node IDs specify document order, but do not preserve the document hierarchy. This function is performed by the ancestry table. While in theory only parent information need be saved, it is usually more efficient to explicitly generate all ancestry relationships (including self). In this manner, SQL queries that drive data retrieval are simpler and more efficient. There are only two fields in the ancestry table:
- desc_id—the node ID of a descendant node; and
- anc_id—the node ID of an ancestor node.

FIG. 4 illustrates an ancestry table 40 corresponding to the FIG. 1 dataset. Each record in the ancestry table 40 contains a desc_id field 42 and an anc_id field 44. The first record in the ancestry table 40 contains a desc_id field containing node_id 300 and an anc_id field containing node_id 300. This record defines the ancestral relationship that node_id 300 has with itself. The second record in the ancestry table 40 contains a desc_id field containing node_id 310 and an anc_id field containing node_id 300. Thus, the second record indicates that node_id 310 is a descendant of node_id 300. The ancestry table 40 preserves the hierarchical structure of the XML fragment from FIG. 1 using SQL tables.

While simple properties can be stored in the node table, complex properties have to be handled separately. Complex properties can occur more than once per node (e.g. a set of see also links), and can possess sub-properties (e.g. a set of chapter titles which have corresponding start and end dates). There is typically one table per complex property with the following fields:
- node_id—the unique ID of the node to which the property applies:
- value—the value of the property; and
- other fields if required for sub-properties.

FIG. 5 illustrates how dated higher level titles can be set up as a SQL table. FIG. 5 shows a complex property table 50. A node_id field 52 allows records in the complex property table 50 to be reconciled with entries in the node table 20 of FIG. 2. Each record in the complex property table 50 contains a start_date field 54, an end_date field 56 and a value field 58. The first record has a node_id of 300, which corresponds to Chapter 3 from the legislation XML fragment of FIG. 1. The first record of the complex property table 50 indicates that a value "Directors' Responsibilities" is associated with node_id 300 and has a start_date of 1996-07-15. The absence of a corresponding end_date indicates that the value is currently applicable.

While the conversion can be driven entirely automatically, the best results are achieved when the mapping is matched to the needs of specific applications. To this end, the user can supply the following:
- the node element set;
- simple properties (derived from element names, attributes or content);
- complex properties and sub-properties; and
- content conversion algorithm.

The above information is quite simple to produce and sufficient to drive the mapping process to completion.

A strategy and software, to be known as "MALTmap", have been described for converting arbitrary XML data into SQL tables. Unlike conventional tree mapping techniques, MALTmap is designed to produce an optimal SQL table set with a minimum of tables and records. In this way, the performance and management benefits of using SQL are maximized.

The method of converting XML data into SQL tables is preferably practised using a general-purpose computer system 600, such as that shown in FIG. 6 wherein the processes described above with respect to FIGS. 2 to 5 may be implemented as software, such as an application program executing within the computer system 600. In particular, the steps of a method of converting XML data into SQL tables are effected by instructions in the software that are carried out by the computer. The instructions may be formed as one or more code modules, each for performing one or more particular tasks. The software may also be divided into two separate parts, in which a first part performs the processes described above with respect FIGS. 2 to 5 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for the processes described above with respect to FIGS. 2 to 5.

The computer system 600 comprises a computer module 601, input devices such as a keyboard 602 and mouse 603, output devices including a printer 615 and a display device 614. A Modulator-Demodulator (Modem) transceiver device 616 is used by the computer module 601 for communicating to and from a communications network 620, for example connectable via a telephone line 621 or other functional medium. The modem 616 can be used to obtain access to the Internet, and other network systems, such as a Local Area Network (LAN) or a Wide Area Network (WAN).

The computer module 601 typically includes at least one processor unit 605, a memory unit 606, for example formed from semiconductor random access memory (RAM) and read only memory (ROM), input/output (I/O) interfaces including a video interface 607, and an I/O interface 613 for the keyboard 602 and mouse 603 and optionally a joystick (not illustrated), and an interface 608 for the modem 616. A storage device 609 is provided and typically includes a hard disk drive 610 and a floppy disk drive 611. A magnetic tape drive (not illustrated) may also be used. A CD-ROM drive 612 is typically provided as a non-volatile source of data. The components 605 to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations or alike computer systems evolved therefrom.

Typically, the application program is resident on the hard disk drive 610 and read and controlled in its execution by the processor 605. Intermediate storage of the program and any data fetched from the network 620 may be accomplished using the semiconductor memory 606, possibly in concert with the hard disk drive 610. In some instances, the application program may be supplied to the user encoded on a CD-ROM or floppy disk and read via the corresponding drive 612 or 611, or alternatively may be read by the user from the network 620 via the modem device 616. Still further, the software can also be loaded into the computer system 600 from other computer readable media. The term "computer readable medium" as used herein refers to any storage or transmission medium that participates in providing instructions and/or data to the computer system 600 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of transmission media include radio or infra-red transmission channels as well as a network connection to another computer or networked device, and the Internet or Intranets including email transmissions and information recorded on websites and the like.

The method of converting XML data into SQL tables may alternatively be implemented in dedicated hardware such as one or more integrated circuits performing the processes or sub-processes described above with reference to FIGS. 2 to 5. Such dedicated hardware may include one or more microprocessors and associated memories.

INDUSTRIAL APPLICABILITY

It is apparent from the above that the arrangements described are applicable to any industry that has a need for XML encoded text-based data. Examples are the electronic publishing industry, document management, requirements engineering documents, journal articles, manuals, software and other online help.

The foregoing describes only some embodiments of the present invention, and modifications and/or changes can be made thereto without departing from the scope and spirit of the invention, the embodiments being illustrative and not restrictive.

We claim:

1. A method for mapping an XML encoded dataset into a set of SQL tables comprising:
   identifying at least one hierarchical structure associated with said XML encoded dataset; and
   converting said XML encoded dataset associated with said identified hierarchical structure, wherein for said identified hierarchical structure said converting step comprises:
   determining a node element set for said identified hierarchical structure associated with said XML encoded dataset, wherein a node element in said node element set is a discrete level of said identified hierarchical structure of said dataset;
   determining one or more nodes of said XML encoded dataset, said node being an instance of a node element;
   allocating to said node a unique node identifier; and generating an SQL node table containing one or more records, said one or more records corresponding to a respective one or more of said allocated node identifiers;

wherein said XML encoded dataset includes a plurality of predefined portions of text-based data, the plurality of predefined portions of said text-based data being encoded using XML, and being associated with a plurality of attributes for organizing said predefined portions of said text-based data; and wherein said predefined portions include at least one modified and stored predefined portion encoded using XML, said at least one modified predefined portion being associated with one or more attributes for organizing said predefined portions and said modified predefined portion of said text-based data.

2. The method according to claim 1, wherein said XML encoded dataset further comprises a plurality of links of a markup language, at least one of said predefined portions of said text-based data and said at least one modified predefined portion of text-based data being encoded with at least one linking means.

3. The method according to claim 1, wherein said record of said node table contains said node identifier.

4. The method according to claim 3, wherein said record of said node table further comprises a field for each simple property of the corresponding node, a simple property being capable of taking at most one value per node.

5. The method according to claim 1, wherein said node includes at least one of a property, sub-node, initial content, and block content.

6. The method according to claim 1 further comprising:
converting the XML encoded dataset into one or more pre-processed content fields.

7. The method according to claim 6, wherein for said identified hierarchical structure, said converting step further comprises:
storing said one or more pre-processed content fields in an SQL content table, said record in said content table having a node identifier field containing the corresponding node identifier, a block identifier field and a content field.

8. The method according to claim 1, wherein for said identified hierarchical structure, said converting step further comprises:
generating an SQL ancestry table to define the inter-relationships among nodes of said identified hierarchical structure of said XML encoded dataset.

9. The method according to claim 8, wherein said ancestry table includes a descendant node identifier field and an ancestor node identifier field.

10. The method according to claim 1 further comprising:
generating an SQL complex properties table having a node identifier field and a value field.

11. The method according to claim 10, wherein said complex properties table further includes a sub-property field.

12. An apparatus for mapping an XML encoded dataset into a set of SQL tables, said apparatus comprising:
at least one processor for identifying at least one hierarchical structure associated with said XML encoded dataset; and
a converter for converting said XML encoded dataset associated with said identified hierarchical structure, said converter comprising:
at least one processor for determining a node element set for said identified hierarchical structure of said XML encoded dataset, wherein a node element in said node element set is a discrete level of said identified hierarchical structure of said dataset;
at least one processor for determining one or more nodes of said XML encoded dataset, said node being an instance of a node element;
an allocator for allocating to said node a unique node identifier; and
a generator for generating an SQL node table containing one or more records, said record corresponding to a respective one or more of said allocated node identifiers;

wherein said XML encoded dataset includes a plurality of predefined portions of text-based data, said predefined portions of said text-based data being encoded using XML, and being associated with a plurality of attributes for organizing said predefined portions of said text-based data; and wherein said predefined portions include at least one modified and stored predefined portion encoded using XML, said modified predefined portion being associated with one or more attributes for organizing said predefined portions and said modified predefined portion of said text-based data.

13. The apparatus according to claim 12, wherein said XML encoded dataset further comprises a plurality of links of a markup language, at least one of said predefined portion of said text-based data and said at least one modified predefined portion of text-based data being encoded with at least one linking means.

14. The apparatus according to claim 12, wherein said record of said node table contains said node identifier.

15. The apparatus according to claim 14, wherein said record of said node table further comprises a field for said simple property of the corresponding node, a simple property being capable of taking at most one value per node.

16. The apparatus according to claim 12, wherein said node includes at least one of a property, sub-node, initial content, and block content.

17. The apparatus according to claim 12 further comprising:
a converter for converting the XML encoded dataset into one or more pre-processed content fields.

18. The apparatus according to claim 17, wherein said converter for converting an XML encoded dataset associated with each identified hierarchical structure further comprises:
storage for storing said one or more pre-processed content fields in an SQL content table, said record in said content table having a node identifier field containing the corresponding node identifier, a block identifier field and a content field.

19. The apparatus according to claim 18, wherein said converter for converting an XML encoded dataset associated with each identified hierarchical structure further comprises:
a generator for generating an SQL ancestry table to define the inter-relationships among nodes of said identified hierarchical structure of said XML encoded dataset.

20. The apparatus according to claim 19, wherein said ancestry table includes a descendant node identifier field and an ancestor node identifier field.

21. The apparatus according to claim 12, further comprising:
a generator for generating an SQL complex properties table having a node identifier field and a value field.

22. The apparatus according to claim 21, wherein said complex properties table further includes a sub-property field.

23. A computer program product having a non-transitory computer readable medium, said non-transitory computer readable medium having a computer program recorded therein for mapping an XML encoded dataset into a set of SQL tables, said computer program product comprising:
   computer program code for identifying at least one hierarchical structure associated with said XML encoded dataset;
   computer program code for converting said XML dataset associated with said identified hierarchical structure, said computer program code comprising:
      computer program code for determining a node element set for said identified hierarchical structure of said XML encoded dataset, wherein a node element in said node element set is a discrete level of said identified hierarchical structure of said dataset;
      computer program code for determining one or more nodes of said XML encoded dataset, said node being an instance of a node element;
      computer program code for allocating to said node a unique node identifier, and
      computer program code for generating an SQL node table containing one or more records, said one or more records corresponding to a respective one or more of said allocated node identifiers;
   wherein said XML encoded dataset includes a plurality of predefined portions of text-based data, each predefined portion of said text-based data being encoded using XML, and being associated with a plurality of attributes for organizing said predefined portions of said text-based data; and
   wherein said predefined portions include at least one modified and stored predefined portion encoded using XML, said modified predefined portion being associated with one or more attributes for organizing said predefined portions and said modified predefined portion of said text-based data.

24. The computer program product according to claim 23, wherein said XML encoded dataset further comprises a plurality of links of a markup language, at least one of said predefined portion of said text-based data and said at least one modified predefined portion of text-based data being encoded with at least one linking means.

25. The computer program product according to claim 23, wherein said record of said node table contains said node identifier.

26. The computer program product according to claim 25, wherein said record of said node table further comprises a field for a simple property of the corresponding node, a simple property being capable of taking at most one value per node.

27. The computer program product according to claim 23, wherein said node includes at least one of a property, sub-node, initial content, and block content.

28. The computer program product according to claim 23 further including comprising:
   computer program code means for converting the XML encoded dataset into one or more pre-processed content fields.

29. The computer program product according to claim 28, wherein said computer program code for converting an XML dataset associated with said identified hierarchical structure further comprises:
   computer program code for storing said one or more pre-processed content fields in an SQL content table, said record in said content table having a node identifier field containing the corresponding node identifier, a block identifier field and a content field.

30. The computer program product according to claim 23, wherein said computer program code for converting an XML dataset associated with each identified hierarchical structure further comprises:
   computer program code for generating an SQL ancestry table to define the inter-relationships among nodes of said identified hierarchical structure of said XML encoded dataset.

31. The computer program product according to claim 30, wherein said ancestry table includes a descendant node identifier field and an ancestor node identifier field.

32. The computer program product according to claim 23 further including:
   computer program code for generating an SQL complex properties table having a node identifier field and a value field.

33. The computer program product according to claim 32, wherein said complex properties table further includes a sub-property field.

* * * * *